United States Patent [19]

Daringer

[11] Patent Number: 5,562,200
[45] Date of Patent: Oct. 8, 1996

[54] UNITARY COMPONENTS AND MODULAR BELT ASSEMBLY

[75] Inventor: Ronald G. Daringer, Cambridge, Md.

[73] Assignee: Maryland Wire Belts, Inc., Church Creek, Md.

[21] Appl. No.: 217,565

[22] Filed: Mar. 25, 1994

[51] Int. Cl.⁶ .................................................. B65G 17/06
[52] U.S. Cl. ........................................ 198/844.2; 198/850
[58] Field of Search ............................... 198/844.2, 850, 198/851, 853

[56] References Cited

U.S. PATENT DOCUMENTS

| | | | |
|---|---|---|---|
| 2,465,929 | 3/1949 | Rixon | 198/850 |
| 3,095,753 | 7/1963 | Lengyel | 198/850 |
| 3,331,489 | 7/1967 | Mattson | 198/850 |
| 3,628,834 | 12/1971 | Anderson | 198/853 |
| 4,394,901 | 7/1983 | Roinestad | 198/850 |
| 4,473,365 | 9/1984 | Lapeyre | 198/850 X |
| 4,636,181 | 1/1987 | Savolainen et al. | 198/850 X |
| 4,815,270 | 3/1989 | Lapeyre | 59/84 |
| 4,815,271 | 3/1989 | Lapeyre | 59/84 |
| 4,882,901 | 11/1989 | Lapeyre | 198/853 X |

*Primary Examiner*—D. Glenn Dayoan
*Attorney, Agent, or Firm*—Shanley and Baker

[57] ABSTRACT

A weld-free belt is formed by inter-coupled modular assembly of individual unitary components including an elongated link portion and transversely-oriented connector which provides for self-coupling coaction forming an integral rod extending across the width of an assembled belt. The interlocked components are articulated for relative rotational movement across the width of the belt facilitating orderly movement of an assembled belt around curved portions of an endless travel path. Dimensions of the components can be selected to determine the lengthwise-collected relative motion between inter-coupled unitary components to achieve desired travel in a substantially-horizontal curvilinear path, about a tower in stacked conveyor paths, with the internal-periphery lateral side of an assembled belt providing for dynamic frictional drive in the curved-path tower arrangement. The unitary component configuration provided by the invention enables component manufacture to be carried out by molding plastic materials, and/or by compacting particulate ceramics or powdered metals which are subsequently sinter hardened.

14 Claims, 9 Drawing Sheets

UNITARY COMPONENTS AND MODULAR BELT ASSEMBLY

The present invention relates to the fabrication of weld-free conveyor belts. In particular, the invention is concerned with unitary components which can be readily coupled, in a weld-free manner; and, additionally, splicer-link coupling elements and lateral side elements which enable final belt length and width dimensions to be selected and achieved on site to meet user requirements.

Woven metal wire conveyor belts serve important functions in industry because of their durability and versatility in performing a wide variety of functions under differing conditions. However, woven metal wire belts require interweaving and welding; for example, widthwise-extending bars are used to interconnect wire lengths which have been wound into spirals, as set forth in U.S. Pat. No. 4,491,003. Generally, metal wire belts must be assembled at the belt manufacturer's site to a user's specifications. Also, welding and other steps, in assembly of the wire spirals and connecter rods, are carried out manually.

The present invention provides for modular fabrication of belting by a belt manufacturer while retaining and also providing means enabling customizing of belts. For example, length and width belt dimensions can be readily customized to particular needs at a user's site.

Other advantages and contributions are considered in more detail in describing the invention shown in the accompanying drawings; in such drawings.

Conveyor belts are useful for conveying materials in numerous differing industries. Metal wire conveyor belts must be welded in a time-consuming process and typically require belt rods to connect the transverse spiral links of metal. Such belt rods can cause wear to the transverse links.

In a specific embodiment of the present invention, modular plastic belt components are injection-molded. These can be combined in various ways to create a customized conveyor belt without the need for welding or for separate belt rods.

Substantially identical and interchangeable unitary components provide for weld-free coupling in a patterned relationship. The modular fabrication enables assembly to selected lengths and widths.

Figure 1:
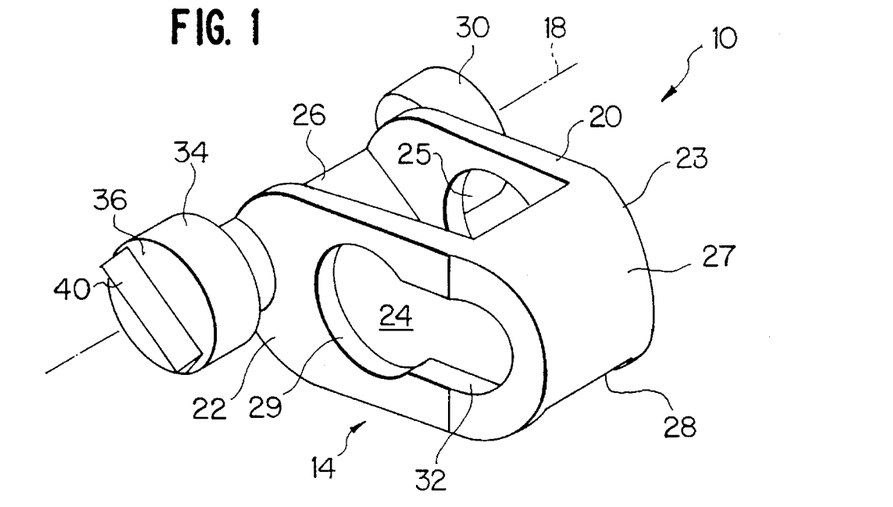
FIG. 1 is a perspective view of a unitary component with dual-side interlocking connector means.

Referring to FIG. 1, a unitary component 10 includes an elongated link portion 14 with a transversely-oriented connector means 16 (FIG. 2) located contiguous to one longitudinal end of the component. The connector means 16 is symmetrical about a centrally-located axis 18 (FIG. 2) which is perpendicular to a longitudinal direction 19 (FIG. 3) of the elongated link portion 14. The configuration of the unitary component 10 (FIGS. 1 and 2) enables fabrication of extended length and width belting by weld-free coupling of substantially identical components.

A plurality of modular components 10, and the belting resulting from coupling of such discrete modules, present a generally planar surface 20 which can be used for conveying materials (not shown) during use as a conveyor belt.

Figure 2:
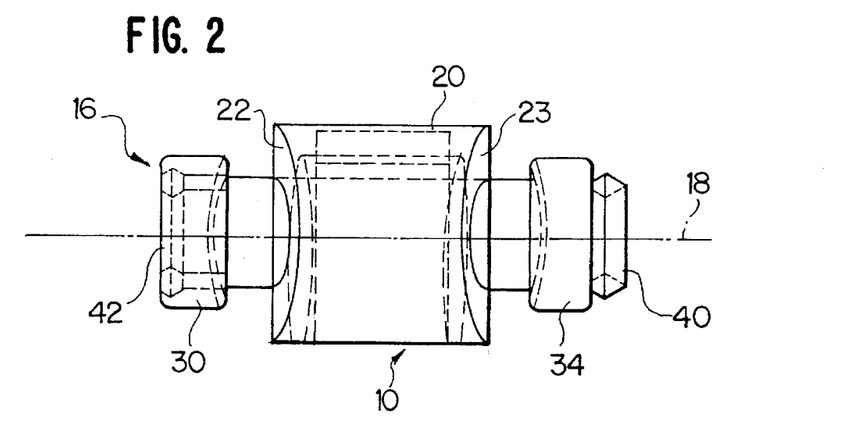
FIG. 2 is a schematic front view of the unitary component of FIG. 1.

The configuration of the unitary components of FIGS. 1 and 2 provides for rotational movement of coupled components in relation to each other about the axis 18 of the connector means 16. An interior configuration of the elongated link portion 14 also provides for longitudinal movement of coupled components relative to each other, without decoupling, where advancement of a belt around curved travel paths requires such relative movement.

Figure 4:
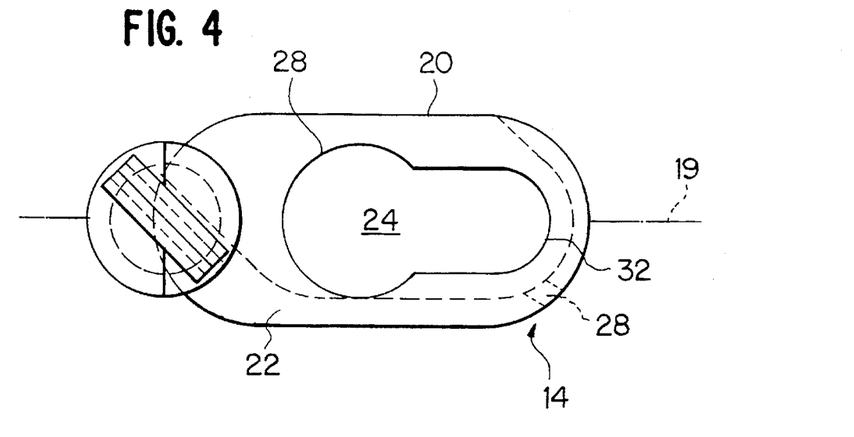
FIG. 4 is a side view of the component of FIG. 1, taken along the longitudinal direction of travel for a belt fabricated in accordance with the invention.

As shown in FIGS. 1, 2 and 4, each elongated link portion 14 includes a side wall 22, 23. Preferably each such sidewall is disposed in a vertical plane at substantially ninety degrees (90°) to the planar surface 20. Each of the link side walls 22, 23 defines an elongated opening 24, 25, respectively, extending in the longitudinal direction 19 of the link portion 14.

Side wall openings enable access to an internal cavity 26 (FIGS. 1,3) leading to an interior bearing surface defined at longitudinal end 27 of component 10 (FIG. 1). An aperture 28 (FIGS. 1, 4 and 11) can be located in longitudinal end 27.

Figure 11:
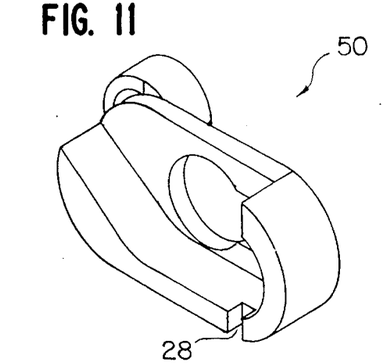
FIG. 11 is a perspective view of a right-hand half-link splicer element for connecting terminal ends of the belt shown in FIG. 10.

As shown in FIG. 11, aperture 28 is located on the lower surface of the closed longitudinal end 22 of the elongated link portion. The purpose for such access aperture is to permit flushing of debris and provide for lubrication of the connected components.

Each link side wall opening includes an enlarged cross-section entry portion 29 (FIG. 1) which is sized to receive a connector flange 30 (FIG. 2) of the connector means 16.

Figure 5:
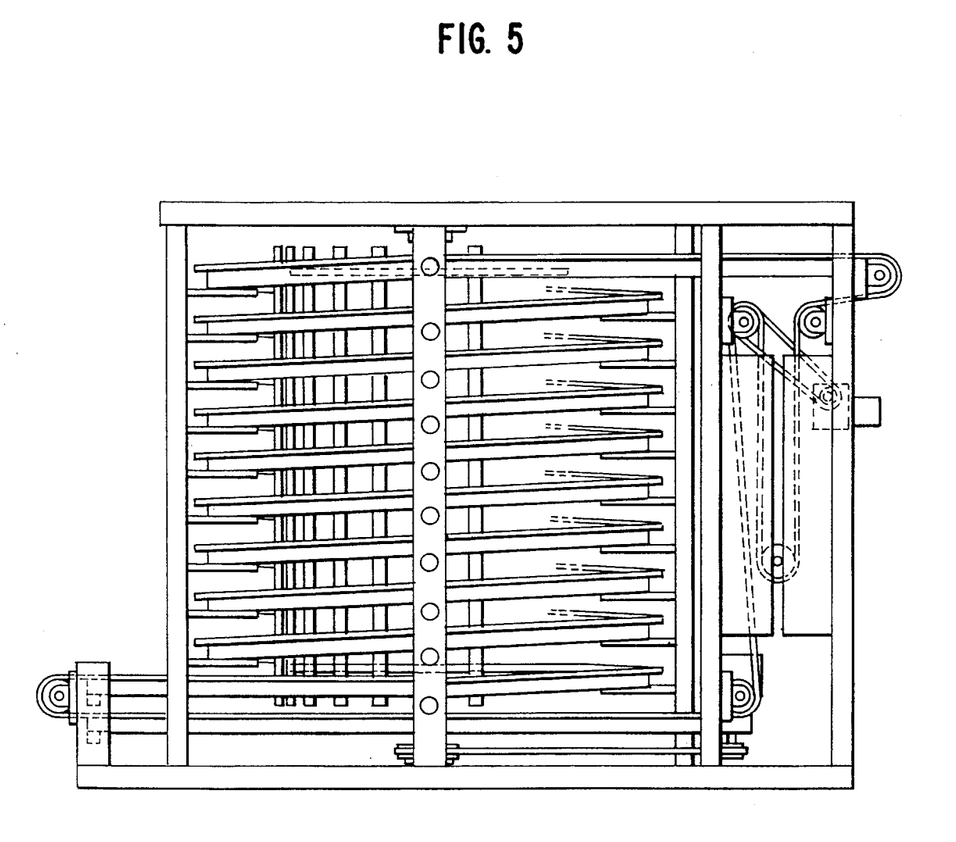
FIG. 5 is a conveyor tower with curved, substantially horizontal, stacked travel paths for curvilinear travel of belts fabricated in accordance with the invention.

A slot portion 32, which is part of each side wall opening, extends from the entry portion 29 (FIGS. 1 and 4) in the longitudinal direction 19 of the link portion 14. Each of the slot portions has a cross-sectional dimension (such as its height) which is less than the corresponding dimension of the entry portion 29. Such foreshortened dimension provides for retention of the connector flange 30 due to any movement of the flange in relation to its entry orientation. The longitudinal dimensions of the slot portions 32 determine the extent of relative longitudinal movement which is available for collected orientation between components during usage in substantially horizontal curvilinear travel paths of the type used in a stacked tower as shown in FIG. 5.

Figure 3:
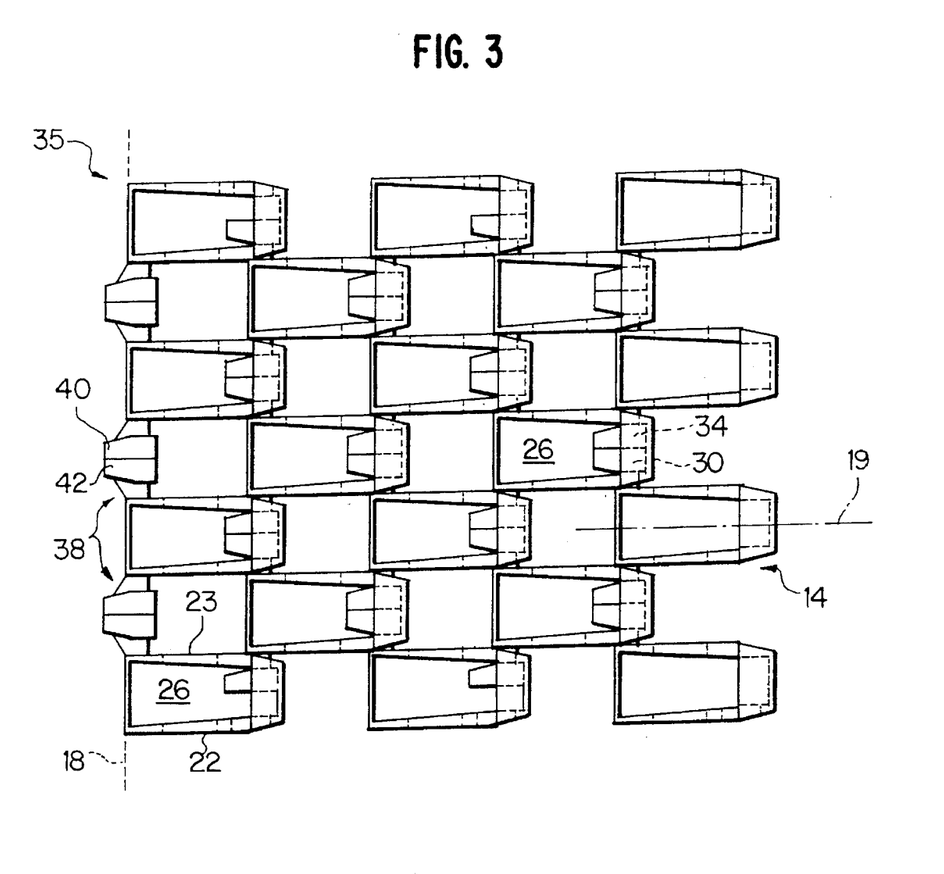
FIG. 3 is a top plan view of a belt section with interlocked components of FIG. 1.

The transverse dimension of an internal cavity 26, as shown in FIG. 3, accommodates a pair of connector flanges 30, 34 inserted from opposite lateral sides. FIG. 3 schematically illustrates connector flanges 30,34 disposed within the internal cavities of contiguous components. A pair of connector means of contiguous unitary components (10) can be coupled within the cavity 26 of a single unitary component. During movement of the belt in which the travel path follows a linear direction, as represented by the assembled belt 35 shown in FIG. 3, the central axis 18 of interlocked connectors is in perpendicularly transverse relationship to the longitudinal direction 19 of the elongated link portions 14.

A cylindrical peripheral configuration is preferred for the flanges 30, 34 located at each axial end, referring to axis 18, of the connector means as shown in FIGS. 1 and 2. The circular cross-sectional configuration, as well as the cross-sectional area of each flange 30, 34 approximates the cross-sectional configuration and area of the side wall entry portion 29 to facilitate coupling assembly and relative hinging during movement of the belt.

The cylindrical periphery flanges 30, 34 are predeterminedly spaced (in the lateral direction along the axis 18) from the respective side wall surfaces 22, 23 of the link of component 10 as shown in FIG. 2 by a dimension which accommodates the thickness of the link side wall portions while readily allowing for relative movement in the longitudinal direction of the slot 32. Such dimensional specifications depend in part on the size of the components and permit such longitudinal relative movement while limiting lateral play between components in the assembly.

Each cylindrical flange readily fits within the enlarged circular cross-section entry portion 29 and is readily retained within the internal cavity 26 during use as shown in FIG. 3. Due to the geometrical configurations and dimensional relationships of the connector flanges, the entry portions, and the slots provided, the components cannot be readily separated if any movement occurs after aligned-entry of a flange. That is, any movement from such aligned-entry position tends to retain the connector flange within the cavity 26 of the component 10.

Flange distal end (surfaces such as 36 of FIG. 1) which are transverse to the connector axis 18 are provided with configurations capable, when aligned along axis 18, of interlocking contiguous connector means 16 into an integral rod 38 (FIG. 3).

A male-type interlocking configuration 40 projects from, and extends diametrically across, the flange endwall surface 36 (FIG. 1). A coacting female-type interlocking enclosed recess 42 (FIG. 2), for the receiving projection 40, is presented as the other half of an interlocking arrangement. The complementary-shaped male 40 and female 42 distal end configurations (FIG. 2) of contiguous connector means interlock as shown in FIG. 3, to prevent relative rotational movement between individual components which are interconnected across the width of the belting. In effect, the axis 18 of each component becomes integral with corresponding axes of components laterally across the width of the belt.

In another embodiment, the female type configuration presents a cavity corresponding to the shape of the male-type configuration, but extends across the full diameter of the flange endwall surface 36 (FIG. 1). Thus, the male and female-type configurations interfit in the confronting relationship without interlocking. Such an embodiment can effectively reduce manufacturing and assembly efforts.

During assembly, a plurality of successive integral rods 38 (FIG. 3) are formed from individual components as shown in FIG. 4. Orderly movement along level linear endless conveyor belt travel paths, and orderly movement along substantially-horizontal curvilinear travel paths are enhanced by such integral rods formed successively in the longitudinal direction across the width of the belt. In addition, the rods provide the belt with improved rigidity for product support.

FIG. 3 illustrates a section of the belt 35 consisting of a plurality of interlocked unitary components 10. The interlocked components present a plurality of integral rods 38 extending in parallel relationship to each other laterally across the width of the section. Each such integral rod 38 is uniformly spaced longitudinally from its next trailing and next leading integral rod during the linear direction of travel of the belt 35 during operation of endless belt travel around conveyor support rails or rollers and in the stacked substantially-horizontal travel paths used in a tower arrangement such as shown in FIG. 5.

EXAMPLE I

Figure 6:
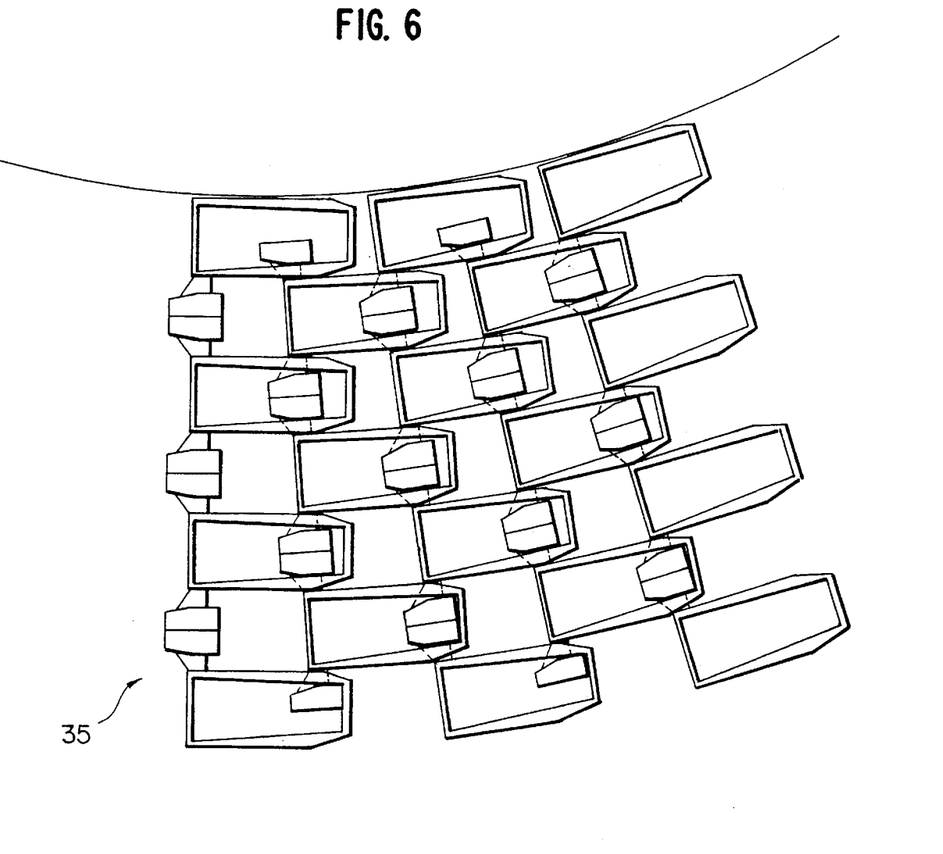
FIG. 6 is a plan view of the belt of FIG. 3, in collected orientation in a curvilinear travel path in the tower shown in FIG. 5.

Unitary Component 10:
  Overall Length 1.503 inches
Link 14:
  Length 1.28 inches
  Width 0.625 inches
  Entry 29 Diameter 0.446 inches
  Slot 32 Length 0.598 inches
  Side Wall (22,23) Thickness 0.062 inches
Connector Means 16:
  Overall Width 1.251 inches
  Flange (30,34) Diameter 0.438 inches
  Spacing Between Side Wall and Flange 0.125 inches Preselected dimensions for the unitary components facilitate relative longitudinal movement of coupled components with respect to each other, such as a collecting action of the components at the inner circumference around a substantially horizontal curvilinear travel path; or, as shown in FIG. 6, in curved paths of the type shown in the stacked curvilinear conveyor tower paths of copending application Ser. No. 08/056,875 now U.S. Pat. No. 5,375,695 (which is incorporated herein by reference).

Figure 7:
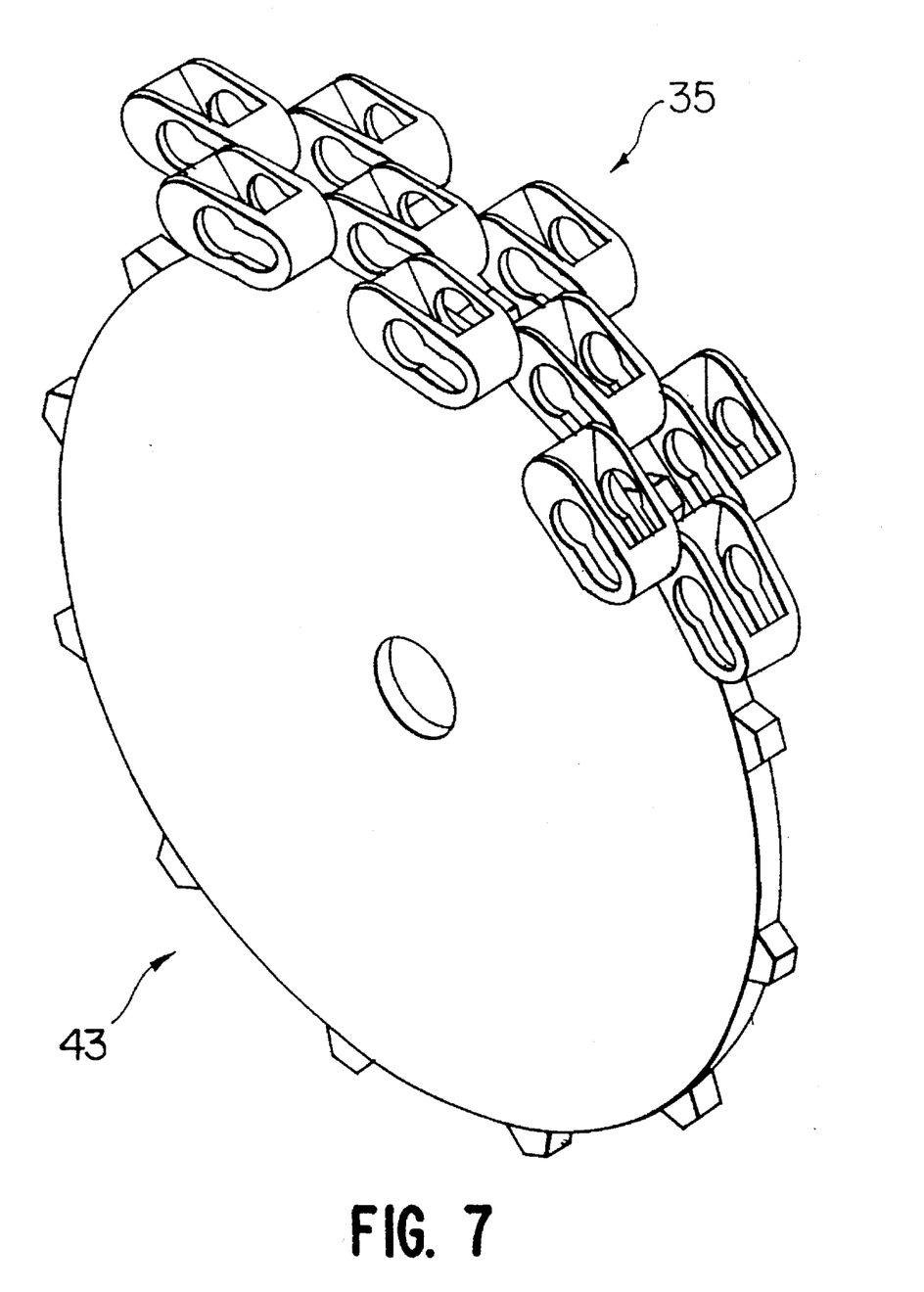
FIG. 7 is a plan view showing sprocket-directed movement of a belt formed from modular components in accordance with the present invention.

A plurality of sprocket drive means 43, as shown in FIG. 7, can be mounted on a shaft and positioned laterally across the width of belt 35. The sprocket teeth interfit in the staggered relationship of the components; for example, contacting components across the width of the belt to drive the belt assembly in the longitudinal direction. The sprocket drives can be judiciously-spaced along roller supports; or a plurality of sprockets can take the place of a roller.

In the curved-path stacked tower arrangement (FIG. 5), the lateral-side wall surface of an endless belt, along the internal circumference of its curvilinear travel path, is used for direct-contact dynamic-frictional drive. The lateral side wall components of the belt (FIG. 6) are configured free of one protruding connector means so that they are capable of being used in the stacked curved path. To facilitate dynamic-frictional side wall drive, such lateral side wall components have a receiving bore to receive a friction enhancing bead 45 (FIG. 8) made of metal or ceramic. Referring to FIG. 9, the friction enhancing bead 45 has a flange 46 with a circumference equal to that of entry portion 29 of component 10, and a reduced circumference connector 47 with a thickness equal to that of sidewall 22.

Figure 8:
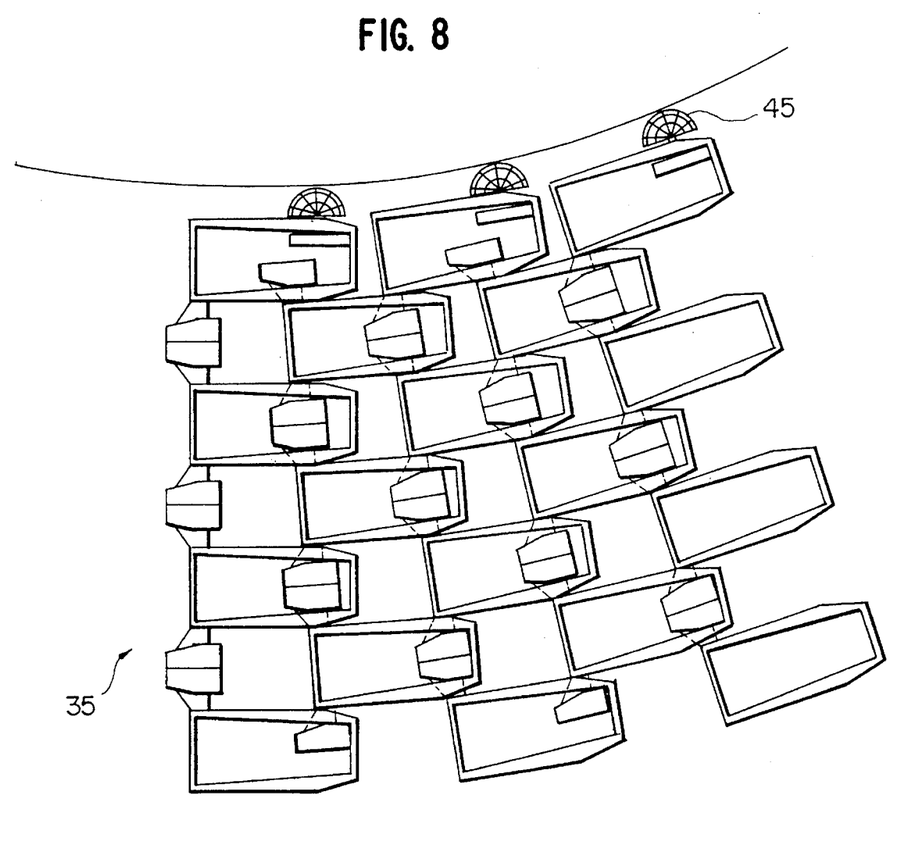
FIG. 8 shows a friction-enhancing bead formed on the lateral side components of the belt shown in FIG. 6.
Figure 9:
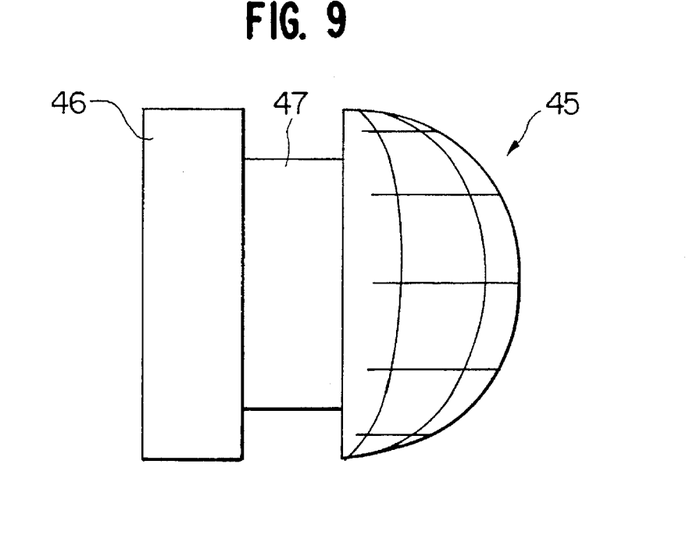
FIG. 9 is a side view, in enlarged scale, of a module presenting the friction-enhancing bead shown in FIG. 8.

As shown in FIG. 8, the friction enhancing beads 45 slightly protrude from the lateral side components of the belt. Either or both lateral sides of a belt can be configured with a friction enhancing bead or provided free of connector protrusions. FIG. 6 shows a section of belt in which both lateral surfaces are free of connector protrusions. FIG. 8 shows a section of belt in which one lateral side presents the friction enhancing bead 45.

Figure 10:
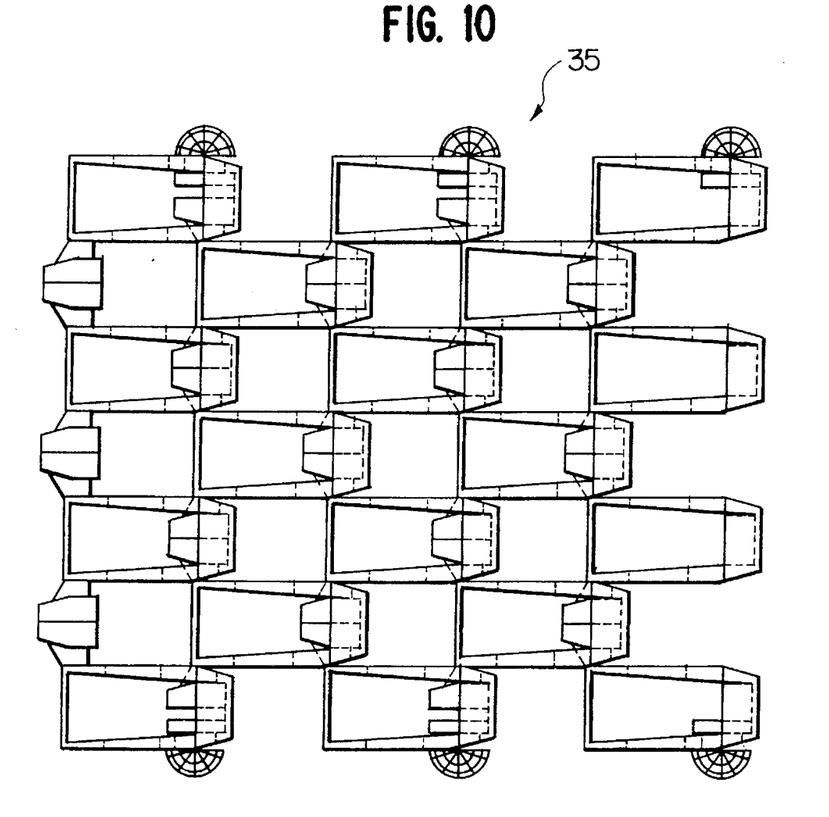
FIG. 10 is a plan view of the belt shown in FIG. 8 in extended direction.

When the belt is in a collected orientation, (FIGS. 6 and 8) a side wall drive surface is provided about the inner circumference of the curvilinear travel paths in the stacked tower by relative longitudinal movements between the components. The belt is collected, along its inner circumference (FIG. 6 and 8), during travel into and around the curvilinear-direction travel path. The belt takes on an extended orientation as shown in FIG. 10 upon leaving such a curvilinear direction for linear direction travel.

The friction enhancing beads 45 facilitate dynamic-frictional drive. The beads do not interfere with the collection and extension actions of component modules upon entering and leaving the curvilinear travel paths; nor do they interfere with the movement required about support rolls or sprockets during normal operation of the belt in endless travel paths.

The configuration of the main body components can be modified for various applications. For instance, the elongated link portion of main body components can be formed with raised portions to provide dividers, often referred to as flights, across the width of the belt; the dividers also function as pushers of materials conveyed by the belt.

Raised portions can be formed on the main body components in the longitudinal direction so as to function as dividers or spacers in that direction to separate materials longitudinally on the belt. Those divider features can be used to achieve substantially uniform distribution of weight on a belt, or substantially uniform distribution of individual items or particulate products being conveyed.

Additionally, raised lateral side retaining portions can be formed on components along each lateral side of a belt, in its longitudinal direction, to retain material(s) on the belt assembly.

Such divider and retainer components can, with present teachings, be readily placed to meet user needs.

The weld-free characteristic of the invention provides significant advantages enabling on-site customization of belts to user requirements. In addition, an assembled belt can be fabricated by the manufacturer to such extended lengths and widths as can be conveniently shipped. Selected incremental length and width belts, as desired by the user, can then be easily and reliably disassembled from such extended length and width belting, and formed into a configuration, such as an endless belt, to meet user needs. Auxiliary elements as described herein are provided for such customized assembly.

Figure 12:
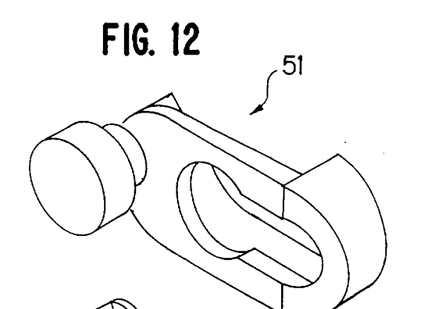
FIG. 12 is a perspective view of a left-hand half-link splicer element for connecting terminal ends of the belt shown in FIG. 10.

To assemble a customized endless belt, an incremental length is selected. Half-link splicer elements are used for weld-free joinder of leading and trailing ends of the belt being customized. A right hand half-link joinder element 50 is shown in FIG. 11. A left hand half-link joinder element 51 is shown in FIG. 12. The half-link components 50, 51 are articulated to enable an endless travel path belt of desired length to be assembled by joinder with link portions (14) of longitudinally leading and trailing unitary components (10), as shown in FIG. 13.

Figure 13:
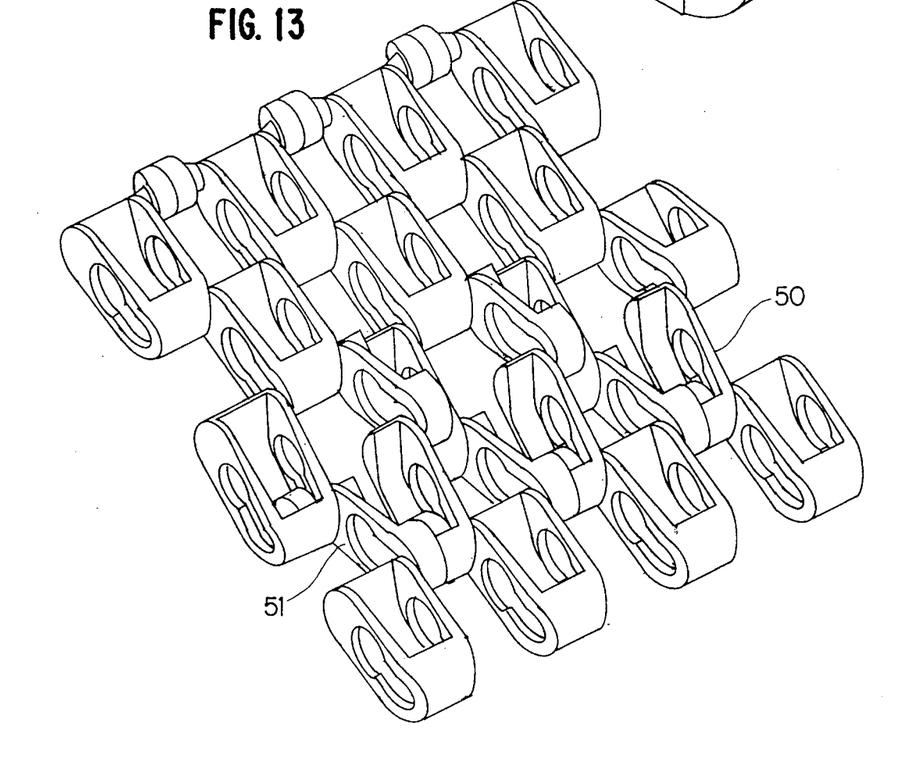
FIG. 13 is a perspective view showing use of the half-link splicer elements of FIGS. 11 and 12 in weld-free assembly of an endless belt.

Referring to FIG. 13, the half-link splicer elements are alternately arranged in up and down positions for joinder with the appropriate corresponding unitary components. The distal end flanges of the connector means of the unitary components located at one end of the belt fit within the entry portions, respectively, of the articulated half-link splicer elements 50, 51.

The connector means flange at the remaining longitudinal end of each such half-link splicer element fits within an internal cavity of a unitary component at the remaining end of the belt. Each such distal end flange is coupled within respective internal cavities of side-by-side modular components (10). The splicing provided for the leading and trailing ends is completed as the belt is flattened under tension. The splicing allows for relative rotational movement free of lateral play.

The half links 50, 51 are fabricated to be approximately the same length as the unitary components 10. Auxiliary half-link elements are shipped with extended lengths of belt to the distributor to be used for customized assembly.

In one embodiment of the unitary modular coupling components, the lateral-side components and the terminal end half-link splicer elements are manufactured by injection-molding of industrial plastics selected to withstand various static and dynamic-loading requirements during assembly and use.

Suitable plastic materials for injection-molding can be selected, for example, from propylenes, nylons, urethanes and ABS copolymers. Desired chemical and physical properties can be selected to enable the unitary components 10 to be used in a wide variety of industrial conveyor applications. Injection-molded components can be electrolytically-plated with metal, or otherwise surface-coated, to improve wear-resistance or appearance. Also, injection-molded plastic components can be strengthened through use of reinforcing fibers.

The unitary modular components can be fabricated to provide for higher-temperature treatment conveyor applications than those available using solely injection-molded plastic. In a specific embodiment, the component configurations can be formed using a carrier for particulate ceramics, followed by a sintering treatment at elevated temperatures, to remove the carrier. The resultant ceramic component provides a desired hardness and strength at elevated temperatures. Compacting and sintering of particulate tungsten carbide provides wear-resistance and high-temperature strength properties.

Particulate ceramic materials and/or powdered metals are selected, as part of the invention, (a) to enable modular assembly of belts capable of maintaining strength characteristics under varying and harsh environment conditions, (b) to provide abrasion and chip-resistant properties for the component modules, and (c) to provide suitable surface toughness for lateral sidewall frictional-drive of a belt.

Economically suitable ceramic materials selected include alumina, zirconia, magnesia or silica carbide, silicon nitride, combinations thereof, as well as other substances.

Powdered metals can be used to enhance properties by compact-molding at high pressures. Such pre-compaction helps to maintain desired dimensions by minimizing shrinkage during sintering. Compensation for dimensional change during sintering is a factor with both ceramic and powdered metals.

Predetermined selected properties of particulate ceramics or powdered metals can be mixed with plastics which act as the carrier forming a composite material with some advantages of each constituent. After injection-molding, the plastic is cured. Properties not available from injection-molding of plastic alone can be obtained. For example, magnetic attraction properties for a belt can be added by selecting the proper hard or soft magnetic type particulate ceramic and/or powdered metal.

The previously described sprocket drive capabilities of the invention are enhanced by the selection of ceramics or powdered metal materials through their use in reinforcing plastics, and/or coating materials which increase the opportunity for longitudinal drive applications requiring higher tensile strength and greater wear resistance in the modular components.

Figure 14:
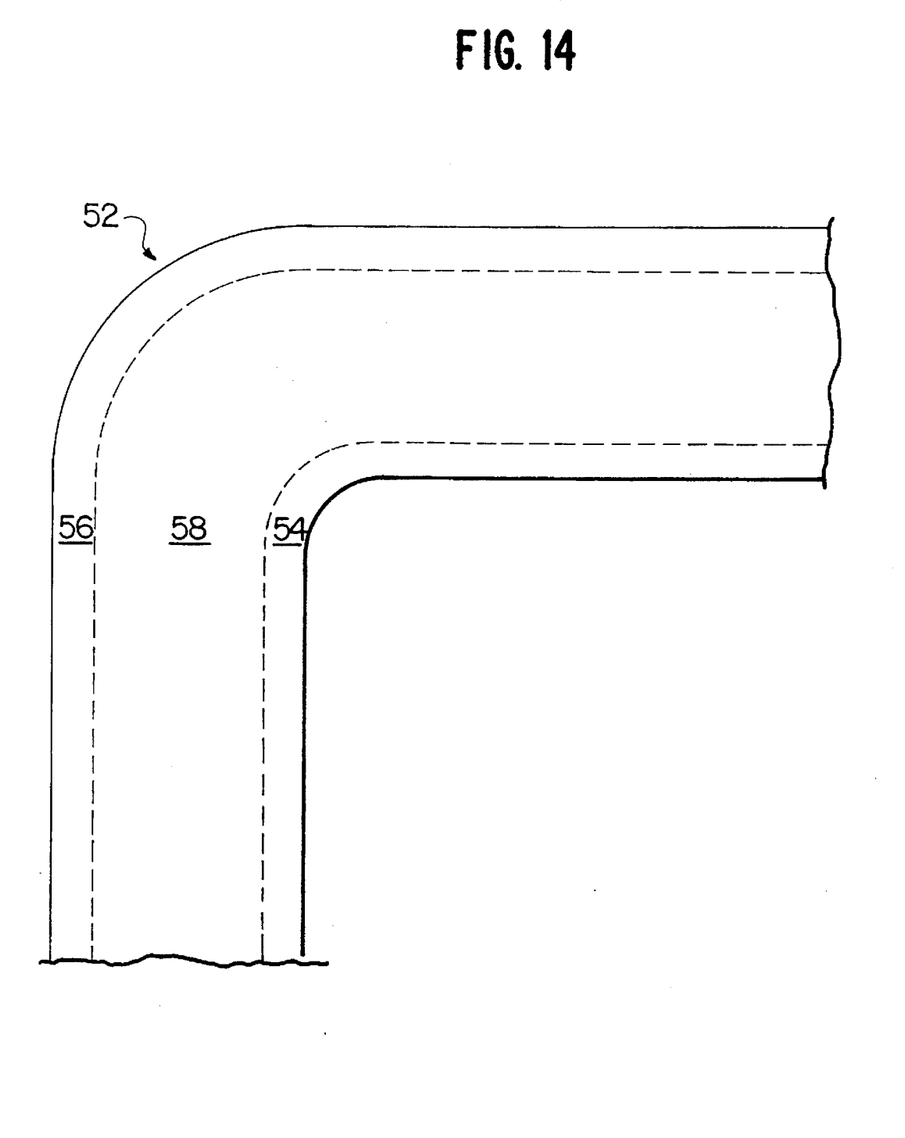
FIG. 14 is a top plan schematic view of a flat travel path with curvilinear portions for describing a preferred use of a specific embodiment of the invention.

The invention enables assembly of a belt using special modular components selected for specific properties. For example, in the specific embodiment 52 of FIG. 14, belt lateral side portions, e.g. along 54, 56, utilize powdered metal or other materials which can increase service life where components are collected, and then extended, longitudinally in relation to each other at the inner circumference lateral side portions during travel around curved paths. The more centrally-located main body components 58 can be injected-molded plastic, or other materials.

Use of components with surface wear durability, as described, enhances the longevity of lateral side components which are exposed to collection and extension action of the belt during travel around curved paths; and, also, such components can be selectively positioned in portion 58 (FIG. 14) to provide durable surface components to better confront sprocket drive teeth, as shown in FIG. 7.

Preferred characteristics of various materials can be readily selected and/or combined because of the teachings of the invention. Dimensional variance between the main body components, splicer elements, and lateral side components is avoided to facilitate belt assembly and selection of belt dimensions. Also, the components and elements made from different materials are kept uniform to facilitate interchangeable usage.

While the invention has been illustrated and described by setting forth specific configurations, dimensions, and materials, it will be understood that changes in form and detail of those specifics can be made in light of the above teachings by those skilled in the art without departing from the spirit and scope of the invention which should be determined in conjunction with the appended claims.

What is claimed is:

1. A unitary main body component for use with substantially-identical components in modular assembly of a weld-free conveyor belt of selected length and width, in which
    each such main body component includes
    (A) elongated link means, and
    (B) connector means located contiguous to one longitudinal end of the elongated link means and extending in transverse relationship from each lateral side thereof;
    such elongated link means extending longitudinally in the direction of intended lengthwise movement of such an assembled conveyor belt with an internal cavity for receiving connector means from each substantially-identical laterally-adjacent main body component, and including
    (i) a support surface, which is horizontally-oriented, for conveyance of material when the assembled conveyor belt is in a horizontal travel path,
    (ii) a pair of sidewalls, each defining an opposite lateral side of such elongated link means,
        each such lateral sidewall being in substantially perpendicular angled relationship to the support surface, so as to present
        an exterior lateral surface of such link means, and
        an interior surface defining, at least in part, such internal cavity of the elongated link means,
        each of such pair of sidewalls further defining
            an access opening for laterally-directed entry of connector means of a laterally-adjacent substantially-identical main body component into such internal cavity, and
            a slot opening extending longitudinally from such access opening,
            such slot opening having at least one smaller cross-sectional dimension than a corresponding dimension of such lateral-entry access opening for retaining connector means of such laterally-adjacent unitary component within such internal cavity upon movement of such connector means from such access opening of such elongated link means in a lengthwise direction, and
    (iii) an endwall means, extending laterally between such pair of sidewalls, forming a closed longitudinal end for such internal cavity and such elongated link means, with
        such unitary component being articulated for relative rotational movement when assembled with other such substantially-identical unitary components, so as to enable lengthwise-directed linear movement of an assembled belt as well as movement about a curved path to continue lengthwise-directed linear movement.

2. The unitary main body component as recited in claim 1, for use with a plurality of substantially-identical main body components, in which
    each such connector means presents
    an enlarged distal end flange having a cylindrical-configuration surface which is symmetrical in relation to a centrally-located axis of such connector means,
    such distal end flange having a cross-sectional configuration, in a plane substantially parallel to such sidewalls, approximating that of the access opening for laterally-directed entry of corresponding connector means of a laterally-adjacent substantially-identical main body component into such internal cavity,
    each such distal end flange of each such connector means being spaced laterally from its respective lateral sidewall exterior surface of the associated link means, so as
    to enable the flange to fit through the lateral entry access opening of a laterally-adjacent unitary main body component, and
    to be retained within such internal cavity by the slot opening when such substantially-identical main body components are assembled with the elongated link means of such components extending in the lengthwise direction of the assembled belt with the central axis of such connector means extending in widthwise direction of such belt.

3. The unitary main body component as recited in claim 2, for use with a plurality of substantially-identical main body components, in which
    each distal end flange presents a lateral surface configuration capable of interlocking with a contiguous distal end flange lateral surface, when a pair of such main body components are connected in side-by-side relationship within an internal cavity of a substantially-identical main body component, with
    such contiguous interlocking configurations forming an integral rod extending across a preselected width of the assembled belt as determined by the number of such interlocked substantially-identical main body components.

4. A conveyor belt assembled from a plurality of substantially-identical main body components as set forth in claim 2, wherein
    the enlarged flange of each connector means presents a preselected lateral surface configuration which, during assembly, interlocks with a mating lateral surface configuration of a connector means of a contiguous main body component when each is inserted, from laterally-opposite sides of an elongated link means, into the internal cavity of a main body component link means for receiving such connector means, and in which an integral rod is formed which extends across a belt width dimension as determined by the number of such components assembled in laterally interlocking side-by-side relationship during such belt assembly.

5. A weld-free belt, assembled from a plurality of substantially-identical main body components as set forth in claim 3, comprising a longitudinally-extended belt of preselected width dimension, including a plurality of integral rods formed by interlocking connector means of respective side-by-side connector means of such main body components, each such integral rod defining a central axis of rotation for main body components interlocked widthwise by such integral rod, a plurality of such integral rods spaced lengthwise of such belt, with such lengthwise spacing being determined by such elongated link means of such assembled substantially-identical main body components, and in which interlocked components forming each such integral rod across the width of the assembled belt rotate about each such respective integral rod central axis, during lengthwise directed movement of the assembled belt about a curved travel surface in an endless travel path.

6. A lateral edge unitary component, for use along a lateral side edge of a weld-free belt as set forth in claim 5, comprising:

an elongated link having a longitudinal direction and dimension corresponding to the lengthwise direction and dimension of each such substantially-identical main body component of such weld-free belt, the elongated link of the lateral edge component, including (i) a support surface for conveyance of material, (ii) a lateral edge sidewall for contacting a dynamic-frictional drive surface moving in a curvilinear path along such lateral side edge of such weld-free belt, (iii) a laterally-opposite sidewall, and (iv) an internal cavity for receiving connector means of a next adjacent main body component to such laterally-opposite sidewall, with such laterally-opposite sidewall, defining an access opening to such internal cavity of the lateral edge components for receiving connector means of such next adjacent main body component, and presenting a single connector means at one longitudinal end of such laterally-opposite sidewall for coupling within an internal cavity defined by the elongated link of such main body component next adjacent to such laterally-opposite sidewall.

7. The lateral edge component as set forth in claim 6, wherein such lateral edge sidewall presents an enlarged opening and an associated slot opening, a friction-enhancing component which is moveable through such enlarged opening and then lengthwise along such associated slot so as to be held in the internal cavity of such lateral edge component, such friction-enhancing component as held in such internal cavity presenting a friction-enhancing bead for contacting such dynamic-frictional drive surface moving in such curvilinear path contiguous to such belt lateral edge.

8. Elements for splicing the leading and trailing ends of a weld-free longitudinally-extending belt formed from substantially-identical unitary main body components as set forth in claim 2, comprising a pair of individual elongated elements which coact to form a splicing component, each such element having a longitudinal direction corresponding to the longitudinal direction of such belt, with each such splicer element including:

(i) a sidewall parallel to such longitudinal direction of such belt, each such respective sidewall being on a laterally-opposite side of the corresponding sidewall of the remaining element when such pair of elements are moved into coacting splicing relationship, each such coacting pair of splicing elements, when moved into such coacting splicing relationship, defining an internal cavity corresponding in configuration and dimension to that of one of such substantially-identical unitary main body members, with (ii) a single connector means for each splicer element sidewall oriented transversely perpendicularly to the longitudinal direction of the elongated element, each such connector means being oppositely-disposed laterally when such pair are in coacting relationship, and (iii) an access opening with associated guide slot opening defined in each such respective sidewall, with such access opening receiving a connector means of a main body component on each respective lateral side of such pair, and such guide slot opening retaining such connector means when such pair of half links are rotatably moved in relation to each other into such coacting relationship defining such internal cavity; with a connector means from a respective leading and trailing end of such belt being retained in the internal cavity defined by such respective pairs of coacting splicer elements.

9. A weld-free longitudinally extended endless belt, comprising:

a plurality of substantially-identical unitary main body components as set forth in claim 3, and a plurality of pairs of elongated splicer elements as set forth in claim 8, with such pairs of elongated elements being in coacting relationship splicing main body components of respective leading and trailing ends into an endless belt.

10. The belt as recited in claim 9, further including lateral edge components as set forth in claim 6, assembled along at least one lateral side edge of such belt to provide for dynamic-frictional drive in a laterally-curved substantially-horizontal travel path.

11. The belt of claim 10, in which such main body components, lateral edge components, and splicer elements are manufactured from a material selected from the group consisting of plastics, fiber-reinforced plastics, ceramics, fiber-reinforced ceramics, and powdered metals.

12. The belt of claim 11, wherein:

a plastic is selected for manufacture of main body and splicer element components, with such plastic being selected from the group consisting of propylenes, nylons, urethanes, and ABS copolymers.

13. The belt of claim 11, wherein:

a ceramic is selected from the group consisting of alumina, zirconia, magnesia, silica carbide, and silicon nitride.

14. Method of assembling elongated conveyor belting free of welding and providing for selection of length and width dimensions as required by on-site use, comprising the steps of:

(A) providing a plurality of unitary main body components as set forth in claim 3, (B) providing a plurality of interlocking connector means of such main body components in side-by-side lateral relationship, each such plurality of main body component connector means forming an integral rod extending widthwise of such belt, providing a plurality of such component connector means uniformly spaced along the length of such belt, (C) providing a plurality of unitary lateral edge components, as set forth in claim 6, connected with main body components along at least one lateral edge of such belt being assembled, (D) providing a plurality of pairs of elongated splicer elements as set forth in claim 8, and (E) connecting each of such respective pairs of elongated elements with main body components, in coacting relationship so as to splice together main body components of respective leading and trailing ends of such belt, to form an endless belt capable of dynamic-frictional drive in contact with such lateral edge component.

\* \* \* \* \*